(12) United States Patent
Escorihuela

(10) Patent No.: US 7,976,994 B2
(45) Date of Patent: Jul. 12, 2011

(54) ELECTRICITY PRODUCTION INSTALLATION COMPRISING FUEL CELLS CONNECTED IN SERIES AND COMPRISING MEANS FOR ISOLATING A CELL AND METHOD FOR MONITORING SUCH AN INSTALLATION

(75) Inventor: Emmanuelle Escorihuela, Brax (FR)

(73) Assignee: Renault S.A.S., Boulogne Billancourt (FR)

( * ) Notice: Subject to any disclaimer, the term of this patent is extended or adjusted under 35 U.S.C. 154(b) by 1131 days.

(21) Appl. No.: 11/576,606

(22) PCT Filed: Oct. 5, 2005

(86) PCT No.: PCT/FR2005/050809
§ 371 (c)(1),
(2), (4) Date: Apr. 4, 2007

(87) PCT Pub. No.: WO2006/037924
PCT Pub. Date: Apr. 13, 2006

(65) Prior Publication Data
US 2008/0213643 A1    Sep. 4, 2008

(30) Foreign Application Priority Data
Oct. 7, 2004 (FR) .................... 04 52295

(51) Int. Cl.
*H01M 8/04* (2006.01)
(52) U.S. Cl. ............... 429/428; 429/400; 429/430

(58) Field of Classification Search ............ 429/400, 429/428, 430
See application file for complete search history.

(56) References Cited

U.S. PATENT DOCUMENTS

| | | | | |
|---|---|---|---|---|
| 5,170,124 A * | 12/1992 | Blair et al. | .............. | 324/434 |
| 6,096,449 A * | 8/2000 | Fuglevand et al. | ............ | 429/431 |
| 6,646,418 B1 * | 11/2003 | Xie et al. | .............. | 320/120 |
| 6,677,066 B1 * | 1/2004 | Jansen et al. | .............. | 429/7 |
| 7,124,040 B2 * | 10/2006 | Engelhardt et al. | ............ | 702/58 |
| 2003/0091882 A1 * | 5/2003 | Schmidt et al. | .............. | 429/23 |
| 2003/0138683 A1 * | 7/2003 | Bai et al. | .............. | 429/23 |
| 2004/0046526 A1 * | 3/2004 | Richards | .............. | 320/101 |
| 2004/0229095 A1 * | 11/2004 | Pearson | .............. | 429/23 |
| 2005/0019621 A1 | 1/2005 | Ikuma et al. | | |

FOREIGN PATENT DOCUMENTS

| | | |
|---|---|---|
| DE | 195 23 260 | 3/1997 |
| EP | 0 982 788 | 3/2000 |
| JP | 2003 115304 | 4/2003 |

* cited by examiner

*Primary Examiner* — Ula C Ruddock
*Assistant Examiner* — Amanda Barrow
(74) *Attorney, Agent, or Firm* — Oblon, Spivak, McClelland, Maier & Neustadt, L.L.P.

(57) ABSTRACT

An electric current production installation, for powering electrical members of a vehicle, including at least two fuel cells electrically connected in series via electric connection lines. Each connecting line includes a connecting switch. The installation further includes bypass lines, each bypass line including a bypass switch, so as to isolate at least one fuel cell by selectively controlling the position of the connection and bypass switches of the lines associated with the cell. A method monitors such an installation.

6 Claims, 3 Drawing Sheets

ELECTRICITY PRODUCTION INSTALLATION COMPRISING FUEL CELLS CONNECTED IN SERIES AND COMPRISING MEANS FOR ISOLATING A CELL AND METHOD FOR MONITORING SUCH AN INSTALLATION

The invention relates to an electric current production installation for an electric drive motor of a motor vehicle comprising at least two fuel cells electrically linked in series.

The invention relates more particularly to an electric current production installation for powering electric units of a vehicle, in particular an electric drive motor, via two, positive and negative, electricity distribution terminals of the installation, which comprises at least two fuel cells each comprising a negative pole and a positive pole, which are electrically linked in series between the two electricity distribution terminals via electrical connection lines in which the electric current circulates in an upstream to downstream direction.

Installing fuel cells on board electric vehicles to power the electric units of the vehicle, particularly an electric drive motor, is known. The fuel cells make it possible, among other advantages, to produce electric current without emitting polluting substances while ensuring a high degree of operating autonomy for the vehicle.

In a known manner a fuel cell is formed by an axial stacking of individual cells which are axially clamped between two bipolar end plates. The bipolar plates form the negative and positive poles of the fuel cell.

Each cell comprises a cathode which is designed to be fed with oxidant, and an anode which is designed to be fed with fuel. The fuel is in this case hydrogen $H_2$, and the oxidant is oxygen $O_2$ contained in the atmospheric air.

Each individual cell can produce an electric current of determined power. The duly stacked cells form electrical direct current generators which are mounted in series between the two bipolar plates.

The maximum electric power that can be produced by a fuel cell therefore depends on the number of stacked individual cells.

Normally, a stacking that is intended to provide an electric current that is sufficiently powerful for a drive motor is axially too long to be housed easily in the vehicle. This is one of the reasons why the stacking is divided into at least two separate stacks thus forming two "small" fuel cells, of shorter axial length, which are mounted in series so as to produce an electric current of the same power as a "single" longer fuel cell.

However, when the vehicle is equipped with a number of fuel cells mounted in series the malfunctioning of a single cell will deprive the vehicle of the electric current that the other cells can still provide.

To overcome this problem, the invention proposes an electric current production installation of the type described previously characterized in that each connection line comprises a connecting switch which can be controlled between a closed position and an open position, and in that it comprises bypass lines, each comprising an upstream end connected to the connection line directly upstream of an associated fuel cell, upstream of the associated connecting switch and a downstream end connected to the connection line directly downstream of the associated fuel cell downstream of the associated connecting switch, each bypass line comprising a bypass switch so as to be able to isolate at least one fuel cell by selectively controlling the position of the connecting and bypass switches of the lines associated with this cell.

According to other characteristics of the invention.

the connecting and bypass switches and the bypass lines are arranged inside an enclosure;

the connection lines and the bypass lines comprise unidirectional semiconductor components which prevent the electric current from circulating in the wrong direction;

the semiconductor components are arranged inside the enclosure;

each connection line which is arranged directly downstream of a fuel cell comprises a fuse which is arranged downstream of the associated connecting switch;

the fuse is arranged inside the enclosure;

the fuse comprises the semiconductor component;

each connection line comprises a section external to the enclosure which links a pole of a fuel cell to the associated connecting switch via a connector which is arranged in a wall of the enclosure;

the two external sections associated with the two poles of one and the same fuel cell are arranged in parallel and close to one another so as to minimize the intensity of the magnetic field produced by the passage of the electric current in these external sections;

each pole of a fuel cell comprises a bipolar plates and each bipolar plate comprises at least one terminal connecting to the associated external section which extends roughly in the plane of the bipolar plate projecting from a peripheral edge of the bipolar plate.

The invention also relates to a method of controlling the installation which is characterized in that it comprises the following steps in succession:

a detection step, during which monitoring means detect that a fuel cell is defective;

a step for stopping the supply of fuel and oxidant to the fuel cell detected as being defective;

a step for disconnecting the electric current production installation from the electric motor so that the circulation of the electric current is totally stopped in the lines;

a step for isolating the defective fuel cell during which the connecting switches associated with the connection lines directly upstream and downstream of the defective cell are ordered to their open position, and during which the bypass switch associated with the bypass line of the defective cell is ordered to its closed position so as to short circuit the defective cell;

a step for reconnecting the electric current production installation to the motor.

According to other characteristics of the method:

in the disconnection step, the fuel cells are disconnected by ordering the opening of the connecting switches associated with the connection lines that are connected to the distribution terminals;

in the electrical disconnection and isolation steps, the drive motor is supplied with electricity by auxiliary electricity supply means;

the auxiliary supply means comprise a battery;

the method comprises a step for warning the driver that is triggered when a fuel cell is detected as defective in the detection step and during which warning means are activated.

Other characteristics and advantages will become apparent when reading the detailed description that follows, for an understanding of which reference should be made to the appended drawings, in which:

FIG. 1 diagrammatically represents an electric current production installation according to the invention which comprises four fuel cells electrically linked in series by connection lines fitted with switches, and which comprises bypass lines comprising switches;

In the description below, a nonlimiting axial, vertical and transverse orientation will be adopted, represented by the arrows "A", "V" and "T" in FIGS. 1 to 4.

In a nonlimiting way, a current circulation direction from upstream to downstream in the connection lines oriented from the positive pole of one fuel cell to the negative pole of the next fuel cell, will be adopted.

Figure 1:
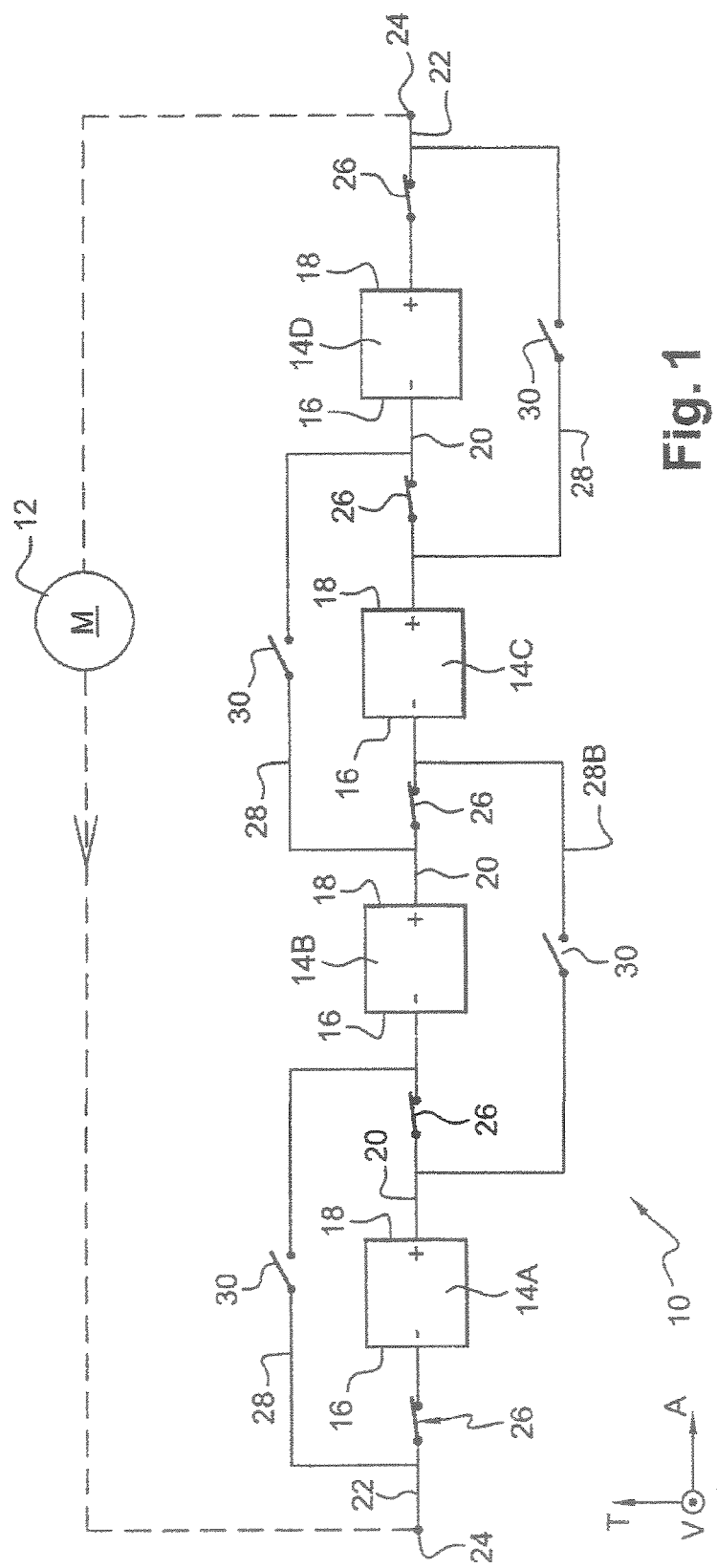

FIG. 1 shows an electric current production installation 10. The installation 10 is mounted on board a motor vehicle, for example in the engine compartment of the latter.

The installation 10 is designed to supply electric current to electric units installed on board the vehicles in particular an electric drive motor 12.

The installation 10 here comprises four fuel cells 14. To simplify the description, the fuel cells are here aligned axially and they are referenced 14A, 14B, 14C, 14D in their order of arrangement in the axial direction. The invention is not, however, limited to this arrangement.

The number of fuel cells 14 is given by way of non-limiting example, the installation 10 comprising at least two fuel cells 14.

Figure 4:
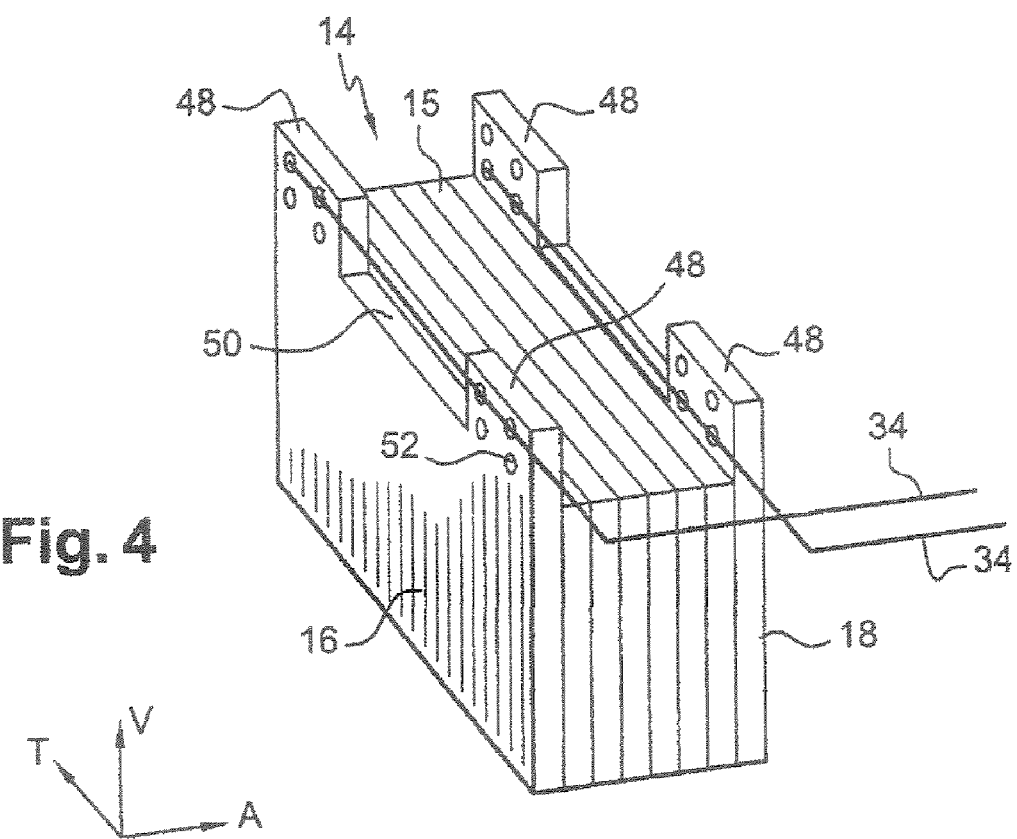
FIG. 4 is a perspective view representing a fuel cell of FIGS. 1 and 2.

As shown in FIG. 4, each fuel cell 14 is produced by an axial stacking of individual cells 15 which are axially clamped between two end bipolar plates 16, 18 which respectively form a negative pole 16 and a positive pole 18 of the fuel cell 14.

Each fuel cell 14 is supplied with fuel and with oxidant by two supply circuits (not shown). For example, the fuel is hydrogen $H_2$ and the oxidant is atmospheric air mainly containing oxygen $O_2$. The control of the fuel and oxidant flow rates controls the electric power supplied by the fuel cells 14.

The fuel cells 14 are electrically linked in series via connection lines 20. Thus, as shown in FIG. 1, the installation 10 here comprises three connection lines 20, one upstream end of which is linked to the positive pole of a first fuel cell 14A, 14B, 14C, and the second downstream end of which is linked to the negative pole of the next fuel cell 14B, 14C, 14D.

The installation 10 also comprises two upstream and downstream end connection lines 22 which respectively link the negative pole 16 of the first fuel cell 14A to a first electric current distribution terminal 24, and the positive pole 18 of the last fuel cell 14D to a second distribution terminal 24. These end connection lines 22 are thus linked to positive and negative distribution terminals 24 which are designed to be linked to the electric drive motor 12 supply circuit.

Thus, the fuel cells 14 are electrically linked in series between the distribution terminals 24.

According to the teachings of the invention, a connecting switch 26 is included in each of the connection lines 20, 22. Each connecting switch 26 can be controlled independently of the others between a closed position in which the electric current can circulate in the associated connection line 20, 22, and an open position in which the electric current cannot circulate.

The installation 10 also comprises four bypass lines 28 which are each associated with a fuel cell 14.

Thus the upstream end of each bypass line 28 is connected to the connection line 20, 22 located directly upstream of the associated fuel cell 14, and more specifically, upstream of the connecting switch 26 of the upstream connection line 20, 22.

The downstream end of each bypass line 28 is connected to the connection line 20, 22 located directly downstream of the associated fuel cell 14, and more specifically downstream of the connecting switch 26 of the downstream connection line 20, 22.

Each bypass line 28 is thus arranged in parallel with the associated fuel cell 14A, 14B, 14C or 14D so as to directly connect the upstream connection line 20, 22 to the downstream connection line 20, 22, short circuiting or bypassing the associated fuel cell 14.

Each bypass line 28 also comprises a bypass switch 30 which can be controlled between an open position and a closed position in a way similar to that described for the connecting switches 26 of the connection lines 20, 22.

Thus, when the connecting switches 26 are in the closed position and the bypass switches 30 are in the open position, the fuel cells 14 are all electrically linked in series to each other.

By selectively controlling the connecting 26 and bypass 30 switches, it is possible to isolate one or more fuel cells 14, while enabling the other fuel cells 14 to supply electric current to the distribution terminals 24.

Thus, if there is a desire to isolate a fuel cell 14B, for example because it is defective, the connecting switches 26 of the connection lines 22 directly upstream and downstream of the fuel cell 14B are ordered to their open position, whereas the bypass switch 30 of the bypass line 28B associated with the fuel cell 14B is ordered to its closed position.

The motor 12 is still supplied by the other three fuel cells 14A, 14C, 14D. The electric current is not stopped by the failed fuel cell 14B, but it bypasses it by circulating in the bypass line 28B.

Figure 2:
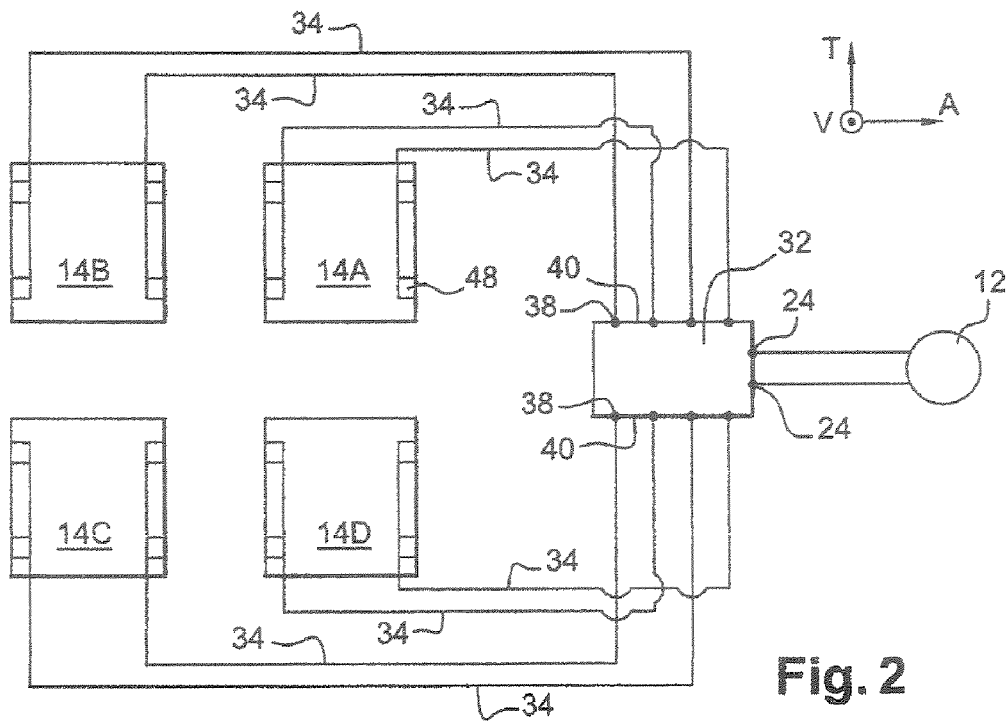
FIG. 2 is a schematic view representing a variant of the invention wherein the bypass switches and lines are arranged inside a connection enclosure.

FIG. 2 shows a second embodiment of the invention.

The four fuel cells 14A, 14B 14C and 14D are here arranged in pairs 14A, 14B and 14C, 14D, in two axially oriented parallel rows.

The installation 10 also comprises a connection enclosure 32 which is designed to electrically connect in series the four fuel cells 14A, 14B, 14C and 14D. To this end, the fuel cells 14 are electrically connected to connectors 38 which are here arranged in two opposite side walls 40 of the connection enclosure 32 via external connection lines 34.

Each side wall 40 thus comprises two pairs of connectors 38. The poles 16, 18 of a particular fuel cell 14 are respectively linked to the connectors of a particular pair of connectors 38 via associated external connection lines 34.

An end wall 42 of the enclosure comprises two connectors 24 forming the distribution terminals 24 of the first embodiment which are electrically linked to the electric drive motor 12

Figure 3:
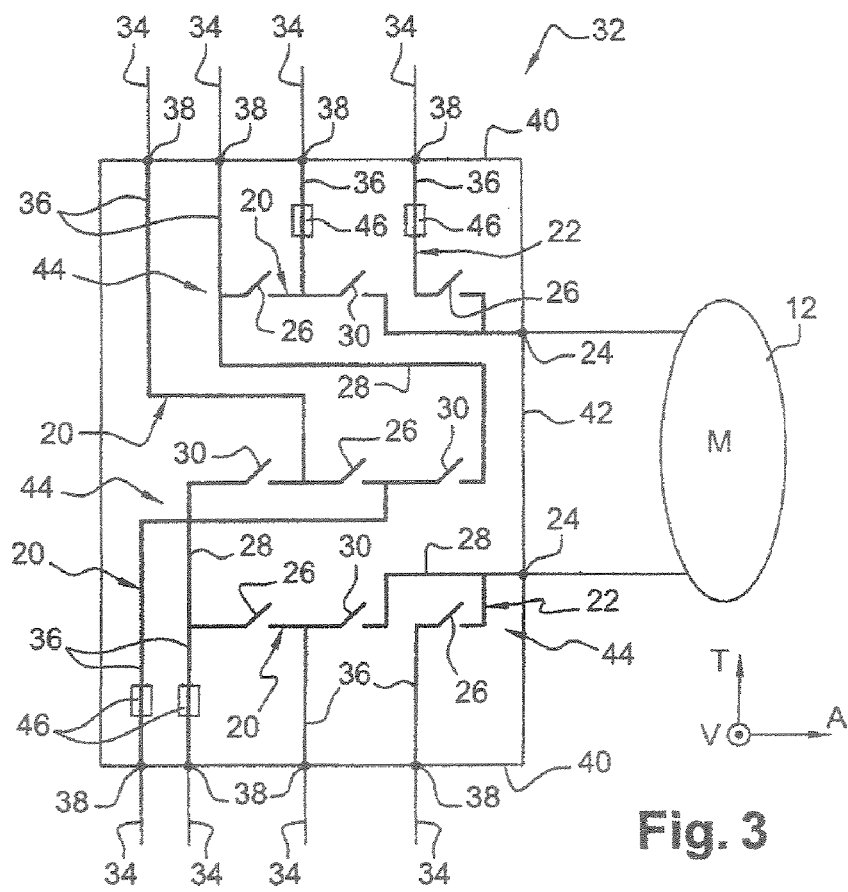
FIG. 3 is a top view diagrammatically representing the arrangement of the switches inside the connection enclosure.

As shown in FIG. 3, the enclosure 32 comprises connection 20, 22 and bypass 30 lines and the associated connecting 26 and bypass 30 switches already described previously, so that the fuel cells 14 are interconnected in series and so that it is possible to isolate at least one of them, as described previously.

The enclosure thus comprises an internal section 36 of the connection lines 20, 22 which is fitted with the associated connecting switch 26 and the bypass lines 28 which are fitted with the bypass switches 30.

The external connection lines 34 are prolonged by the internal connection lines 36 so that the fuel cells 14 are electrically linked in series in the same way as in the first embodiment. Thus, the connection lines 20, 22 described in the first embodiment here comprise an external section 34 and a section 36 internal to the enclosure which are electrically linked via the associated electrical connector 38 arranged inside the wall 40 of the enclosure 32.

Advantageously, as illustrated in FIG. 3, the connecting 26 and bypass 30 switches are arranged in three axially oriented parallel strips 44 each of which comprises three switches 26, 30 which are linked in series in the example shown in FIG. 3, each lateral strip 44 comprises two connecting switches 26 which are connected via a bypass switch 30, while the central strip 44 comprises two bypass switches 30 which are connected via a connecting switch 26.

As illustrated in FIG. 3, the connection lines 20, 22 advantageously comprise a fuse 46 in order to prevent the enclosure 12 from being subjected to excessively high electrical powers which run the risk of damaging it.

The fuses 42 are advantageously inserted, inside the enclosure 12, on the internal connection lines 36 that link the connecting switches 26 to the positive poles 18 of the fuel cells 14.

According to a variant that is not shown, in order to prevent the electric current from circulating in the wrong direction, that is in the downstream to upstream direction, from a negative pole 16 to a positive pole 18, a semiconductor component (not shown can be inserted on the connection lines 20, 22, for example inside the enclosure 12 on the internal connection lines 36 that link the positive poles 18 of the fuel cells 14 to the connecting switches 26.

According to another variant that is not shown, the fuse 46 and the semiconductor component comprise a single element fulfilling both of these functions.

According to another aspect of the invention, the electric current supplied by the fuel cells 14 can be subject to weak variations of intensity at high frequency, which creates electromagnetic waves. Referring to FIG. 2, it can be seen that the two external connection lines 34 associated with a particular fuel cell 14 are advantageously arranged in parallel close to one another so that the electromagnetic waves emitted by each of these external connection lines 34 cancel each other out overall.

According to yet another aspect of the invention, each bipolar plate 16, 18 of the fuel cells 14 comprises a connection terminal 48 which is extended in the transverse vertical plane of the bipolar plate 16, 18, projecting from a peripheral edge 50, as shown in FIG. 4.

The connection terminals 48 here extend vertically upward from the upper transverse peripheral edge 50 of the bipolar plate 16, 18. The bipolar plate 16, 18 comprises two connection terminals 48 which are arranged at the two transverse ends of this edge 50, and to which a particular external connection line 34 is firmly fixed at two fixing points.

These connection terminals 48 make it possible in particular to facilitate the fixing of the connection lines 34 to the bipolar plates or poles 16, 18 of the fuel cells 14, for example via fixing screws (not shown) which are screwed into corresponding fixing orifices 52 of the connection terminals 48.

Advantageously, the fixing orifices 52 of each connection terminal 48 are distributed vertically on two upper and lower levels so as to facilitate the distribution in the space of the external connection lines of the different fuel cells 14A, 14B 14C and 14D.

Thus, as illustrated in FIG. 4, it is possible to fix a first external connection line 34 to the lower level of the connection terminals 48 of the negative bipolar plate 16 of the fuel cell 14, whereas a second external connection line 34 is fixed to the upper level of the connection terminals 48 of the positive bipolar plate 18 of the fuel cell 14. These external connection lines 34 are then arranged vertically one under the other, without there being any need to bend them to obtain this arrangement.

The invention also relates to a method of controlling the electricity production installation 10 according to any one of the embodiments described previously.

Figure 5:
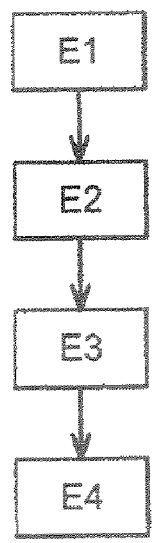
FIG. 5 is a diagram representing the method of controlling the electric current production installation.

The method that is diagrammatically represented in FIG. 5 mainly comprises four steps.

In a first detection step E1 monitoring means (not shown) detect that a fuel cell 14A, 14B 14C or 14D is defective.

When the result of the first detection step E1 is positive, that is, a fuel cell is detected as being defective, a stopping step E2 is triggered. During this second stopping step E2, the fuel and oxidant supply to the defective cell 14A, 14E, 14C or 14D is stopped, particularly in order not to unnecessarily waste fuel and oxidant resources.

This second step E2 is followed by a third step E3 for electrically disconnecting the electric current production installation 10 from the electric motor 12, during which the set of fuel cells 14 is isolated from the various electric units of the vehicle, so that no electric current circulates inside the connection enclosure 32, or, generally, in the connecting 26 and bypass 30 switches.

The fuel cells 14A, 14B, 14 and 14D are, for example, disconnected by ordering the connecting switches 26 associated with the upstream and downstream end connection lines 22 to their open position.

When the third step E3 is completed, a fourth step E4 for isolating the defective fuel cell 14A, 14B, 14C or 14D is triggered. During this fourth step E4, the connecting switches 26 which are associated with the connection lines 20, 22 directly upstream and downstream of the defective cell 14A, 14B, 14C or 14D are ordered to their open position, and the bypass switch 30 which is associated with the bypass line 28 of the defective cell 14A, 143, 14C or 14D is ordered to its closed position.

With the fuel cells 14 having been disconnected from the electric units of the vehicle in the third step E3, no electric current circulates in the enclosure 32. Thus, the switching of the connecting 26 and bypass 30 switches from one position to the other does not risk creating electric arcs that can cause a fire to start.

At the end of the fourth step E4, the defective fuel cell 14A, 14B, 14C or 14D is isolated and the active fuel cells 14 can be reconnected to the electric units of the vehicle in total safety in a final step E5 for reconnecting the motor 12 to the fuel cells 14 that are still active.

According to a variant of the invention that is not shown, in order not to totally stop the operation of the electric units of the vehicle, particularly the electric motor 12, in the electrical disconnection E3 and isolation E4 steps, the vehicle comprises auxiliary electricity supply means (not shown) such as a battery or an accumulator. The electric drive motor 12 can thus be supplied with electricity by these auxiliary means.

In order to notify the driver of the vehicle that the electricity production installation 10 is defective and that a fuel cell has to be repaired or replaced, it is possible to provide a step for warning the driver that is triggered when a fuel cell is detected as being defective in the detection step E1. During this warning step, warning means are activated in the vehicle passenger compartment, such as a light indicator positioned on the dashboard and/or an audible signal.

The invention claimed is:
1. A method of controlling an electric current production installation for powering electrical units of a vehicle, the method comprising:

feeding at least two fuel cells of the production installation with fuel and with oxidant to produce an electric current, the at least two fuel cells being electrically linked in series between positive and negative electricity distribution terminals;

detecting by a monitor device whether one of the at least two fuel cells is defective;

stopping supply of the fuel and the oxidant to a fuel cell detected as defective;

disconnecting the electric current production installation from the electrical units of the vehicle so that circulation of the electric current, which is circulated within electric current production installation in an upstream to downstream direction, is totally stopped;

isolating the defective fuel cell by ordering an upstream connecting switch and a downstream connecting switch respectively located on an upstream connection line directly upstream of the defective cell and a downstream connection line directly downstream of the defective cell to switch to an open position, the open position being a position which prevents electrical current from flowing;

electrically bypassing the defective cell via a bypass line having an upstream end connected to the upstream connection line upstream of the upstream connecting switch, and a downstream end connected to the downstream connection line downstream of the downstream connecting switch, the bypassing ordering a bypass switch located on a bypass line of the defective cell to switch to a closed position to short circuit the defective cell; and reconnecting the electric current production installation to the electrical units of the vehicle.

2. The method as claimed in claim 1, wherein the at least two fuel cells are electrically linked in series between the positive and negative electricity distribution terminals of the electric current production installation via electrical connection lines, each of the connection lines including a connection switch configured to be controlled between the closed position and the open position, and in the disconnecting, the at least two fuel cells are disconnected by ordering the connecting switch of each of the connection lines connected to the distribution terminals to switch to the open position.

3. The method as claimed in claim 1, wherein in the disconnecting and isolating, a drive motor is supplied with electricity by an auxiliary electricity supply device.

4. The method as claimed in claim 3, wherein the auxiliary supply device comprises a battery.

5. The method as claimed in claim 1, further comprising warning a driver when a fuel cell is detected as defective in the detecting by activating a warning device.

6. The method as claimed in claim 1, wherein the isolating and the electrically bypassing include selectively controlling a position of the bypass switch, and the upstream connecting switch and the downstream connecting switch associated with the defective fuel cell.

* * * * *